(12) United States Patent
Nakatani et al.

(10) Patent No.: US 7,278,332 B2
(45) Date of Patent: Oct. 9, 2007

(54) LINEAR MOTION DEVICE

(75) Inventors: Shinya Nakatani, Kanagawa (JP);
Masahiko Yamazaki, Kanagawa (JP);
Hirotoshi Miyajima, Kanagawa (JP);
Yasuyuki Matsuda, Kanagawa (JP)

(73) Assignee: NSK Ltd., Tokyo (JP)

( * ) Notice: Subject to any disclaimer, the term of this patent is extended or adjusted under 35 U.S.C. 154(b) by 1018 days.

(21) Appl. No.: 10/345,362

(22) Filed: Jan. 16, 2003

(65) Prior Publication Data
US 2006/0101935 A1   May 18, 2006

(30) Foreign Application Priority Data
Jan. 17, 2002   (JP) .................. P. 2002-008722
Nov. 11, 2002   (JP) .................. P. 2002-326934

(51) Int. Cl.
*F16C 29/06* (2006.01)
*F16H 25/22* (2006.01)

(52) U.S. Cl. ............... 74/89.44; 74/424.82; 74/424.88; 384/13; 384/45

(58) Field of Classification Search ............. 74/424.82, 74/424.88, 89.44; 384/43, 45, 13
See application file for complete search history.

(56) References Cited

U.S. PATENT DOCUMENTS 5,714,444 A * 2/1998 Yokouchi et al. ........... 508/539
6,176,149 B1* 1/2001 Misu ....................... 74/424.82

FOREIGN PATENT DOCUMENTS

| JP | 2001-389586 | 12/1921 |
| JP | 09-217745 | * 8/1997 |
| JP | 2000-120825 | 4/2000 |
| JP | 2000-205280 | 7/2000 |
| JP | 2001-21018 | 1/2001 |
| JP | 2001-59094 | 3/2001 |

* cited by examiner

*Primary Examiner*—William C. Joyce
(74) *Attorney, Agent, or Firm*—Sughrue Mion Pllc.

(57) ABSTRACT

A linear motion device has: a linear motion body externally fitted onto a shaft and making a relative linear motion along the shaft; a plurality of balls retained in a rolling element groove formed in an inner surface of the linear motion body, and rolling between the rolling element groove and the shaft; separators interposed among the balls; and a circulating path formed in the linear motion body and for circulating the balls from one end side of the rolling element groove to the other end side thereof; wherein the linear motion device is charged with grease containing base oil which is 220-395 in worked penetration defined by JIS K2220 and 50-500 mm²/s in kinematic viscosity at 40° C.

8 Claims, 10 Drawing Sheets

LINEAR MOTION DEVICE

BACKGROUND OF THE INVENTION

1. Field of the Invention

The present invention relates to linear motion devices incorporated into industrial machines, such as ball screw devices, linear guide devices, linear ball bearing devices and ball spline devices. Of these linear motion devices, the present invention particularly relates to a technique for improving the durability of linear motion devices such as injection molder driving ball screws or machine tool ball screws used with grease lubrication, and vibration absorbers, when the linear motion devices are used in high contact pressure conditions.

2. Description of the Related Art

Linear motion devices using balls as rolling elements are conventional used. For example, ball screw devices are used for converting a rotary motion into a linear motion in machine tools such as machining centers or industrial robots, and linear guide devices are used for smooth linear movement of work tables or the like.

FIG. 1 is a top view showing an example of a ball screw device which is one of linear motion devices. FIG. 2 is a sectional view taken on line A-A in FIG. 1. As illustrated, the ball screw device has a screw shaft 2, a cylindrical nut 4 and a plurality of balls 5 as its chief constituent members. A male thread groove 1 is formed spirally in the outer circumference of the screw shaft 2, while a female thread groove 3 is formed spirally in the inner circumference of the nut 4 so as to be opposed to the male thread groove 1. The balls 5 are interposed between the male thread groove 1 and the female thread groove 3. A flange 6 to be fixed to a not-shown table or the like is formed in one end of the nut 4 while a flat surface (notched surface) 7 is cut in a part (upper in FIG. 2) of the outer circumferential surface of the nut 4. A pair of front and rear steel tubes 8 are fixed to the nut 4 so as to serve as circulating paths for the balls 5. Thus, there is formed a structure in which the balls 5 making 3.5 rotations between the thread grooves 1 and 3 circulate through the tubes 8. Incidentally, in FIGS. 1 and 2, the reference numeral 9 represents a tube clamp for fixing the tubes 8 onto the flat surface 7 of the nut 4, and 10 represents a dust-proof plastic seal attached to each end of the nut 4.

Generally, the ball screw device in FIG. 1 is also referred to as a tube method because it uses the tubes 8 as circulating paths. As for the circulating system, there are some systems other than the tube method, such as a deflector method (FIG. 3) using deflectors 11 as circulating paths, and an end cap method (FIG. 4) using end caps 12 as circulating paths. Most of ball screw devices for use in high-load applications adopt the tube method.

FIG. 5 shows a linear guide device which is one of linear motion devices. As illustrated, the linear guide device has a bearing 14, a rail 16 and a plurality of balls 17 as its chief constituent members. The bearing 14 has a bearing raceway groove 13 formed in its inner surface. A rail raceway groove 15 opposed to the bearing raceway groove is formed in the outer surface of the rail 16. The balls 17 are interposed between the bearing raceway groove and the rail raceway groove. An end cap 18 is attached to each end of the bearing raceway so as to form a circulating path in cooperation with a circulating passageway 19 formed in the bearing. Thus, there is formed a structure in which the plurality of rolling elements can circulate.

In addition, grease is often used for lubrication in such linear motion devices. For example, it is typical to adopt a method for frequently intermittently feeding mineral-lithium-based extreme pressure grease using lithium or lithium complex soap as thickener and mixed with an extreme pressure agent.

Such a linear motion device has an advantage in that the driving efficiency is extremely high because the linear motion device supports a load through balls and friction loss during operation is therefore nearly negligible, or much smaller than in a corresponding sliding screw or a corresponding sliding support member. In addition, the linear motion device has advantages in that the friction among the constituent members is extremely slight and the mechanical efficiency is high because the relative rotation between the screw shaft 2 and the nut 4 is not accompanied by sliding.

However, the field of applications of linear motion devices highs in mechanical efficiency has been expanded with the recent tendency of power saving in machinery and equipment. Thus, the working conditions of linear motion devices are becoming more and more harsh. For example, as for the case of ball screw devices, there is increasing use of a ball screw device even in a driving unit of an apparatus requiring very high driving power, such as an injection molder or a pressing machine which has been driven by a hydraulic system in the related art. In such a ball screw device used in high load conditions, indentation or peeling is apt to occur in the ball surface so that the ball screw device has to be exchanged more frequently. In addition, grease should be fed at a shorter interval so that the grease consumption increases.

In addition, there is increase use of linear guide devices in quake absorbing mechanisms for housing. A very high load is applied to linear guide devices used for supporting buildings in comparison with linear guide devices used in machine tools. In addition, once installed in the buildings, most of the linear guide devices get along without maintenance over a long term. Thus, such linear guide devices are required to have high durability.

In order to improve the durability of a linear motion device, various techniques have been proposed in the related art. For example, there is known a ball screw device in which spacers each having a specific shape are interposed among balls (e.g. see JP-A-2001-21018); a ball screw device in which spacers having central positions displaced from one another and each having an arc surface like a Gothic arch are interposed among balls (e.g. see JP-A-2000-120825); a technique using a low-dust lubricant using base oil with defined surface tension at 25° C. (e.g. see JP-A-2001-59094); or a technique covering a contact surface with a high hard film (e.g. see JP-A-2000-205280).

SUMMARY OF THE INVENTION

The present invention was developed in consideration of such circumstances. It is an object of the present invention to provide a linear motion device superior in durability in which device occurrence of indentation or peeling is suppressed in the ball surface and the raceway surface even if the linear motion device is used in high contact pressure conditions.

In order to attain the foregoing object, the present invention provides the following linear motion devices.

A linear motion device including: a linear motion body externally fitted onto a shaft and making a relative linear motion along the shaft; a plurality of balls retained in a rolling element groove formed in an inner surface of the linear motion body, and rolling between the rolling element groove and the shaft; separators interposed among the balls;

and a circulating path formed in the linear motion body and for circulating the balls from one end side of the rolling element groove to the other end side thereof; wherein the linear motion device is charged with grease containing base oil which is 220-395 in worked penetration defined by JIS K2220 and 50-500 mm²/s in kinematic viscosity at 40° C.

In the above construction, it is preferable that surfaces of each of the separators in contact with the balls are concave surfaces each formed with a curvature radius larger than a radius of each of the balls, and a through hole formed to penetrate each of the separators from one of the concave surfaces to the other of the concave surfaces is formed in a central portion of the separator, while lips made of separate members are provided additionally to the separator at a plurality of locations in a circumferential edge of each of the concave surfaces so as to extend outward.

A linear motion device including: a linear motion body externally fitted onto a shaft and making a relative linear motion along the shaft; a plurality of balls retained in a rolling element groove formed in an inner surface of the linear motion body, and rolling between the rolling element groove and the shaft; a circulating path formed in the linear motion body and for circulating the balls from one end side of the rolling element groove to the other end side thereof; and separators interposed among the balls; wherein each of the separators has contact surfaces each contacting with the ball and having a concave surface like an offset Gothic arch, a ratio $f_p=r_p/D_w$ of a curvature radius $r_p$ of the concave surface to a ball diameter $D_w$ is in a range of from 0.53 to 0.67, a ratio $\Gamma=A_p/D_w$ of an offset $A_p$ of the Gothic arch to the ball diameter $D_w$ is in a range of from $3.486\times10^{-1}f_p-1.743\times10^{-1}$ to $3.390f_p-1.700$, and a ratio $\theta=d/D_w$ of an outer diameter d of the separator to the ball diameter $D_w$ is in a range of from 0.6.5 to 0.85, or each of the separator has concave surfaces each contacting with the ball, the concave surface being a conical surface shape with an apex angle α not smaller than 64° and not larger than 140°, and a ratio $\theta=d/D_w$ of an outer diameter d of the separator to the ball diameter $D_w$ is in a range of from 0.65 to 0.85; wherein the linear motion device is charged with grease containing base oil and thickener, the base oil being 50-500 mm²/s in kinematic viscosity at 40° C., the thickener being contained at 3-40% by mass with respect to whole mass of the grease so that worked penetration defined by JIS K2220 is 220-395.

In the above construction, it is preferable that the grease contains at least one kind of extreme pressure agent selected from an organic nickel compound, an organic molybdenum compound and an organic tellurium compound at 0.1-15% by mass with respect to whole mass of the grease.

In the above construction, it is preferable that a ratio $f=r/D_w$ of a rolling element groove radius r to the ball diameter $D_w$ is in a range of from 0.505 to 0.550.

In the above construction, it is preferable that the linear motion device is a ball screw device.

DESCRIPTION OF THE PREFERRED EMBODIMENTS

Detailed description will be made below on linear motion devices according to the present invention.

In the present invention, the kind of linear motion device and its specific configuration or structure are not limited particularly. The present invention is applicable to ball screw devices, linear guide devices, linear ball bearing devices, ball spline devices, and the like.

Figure 6:
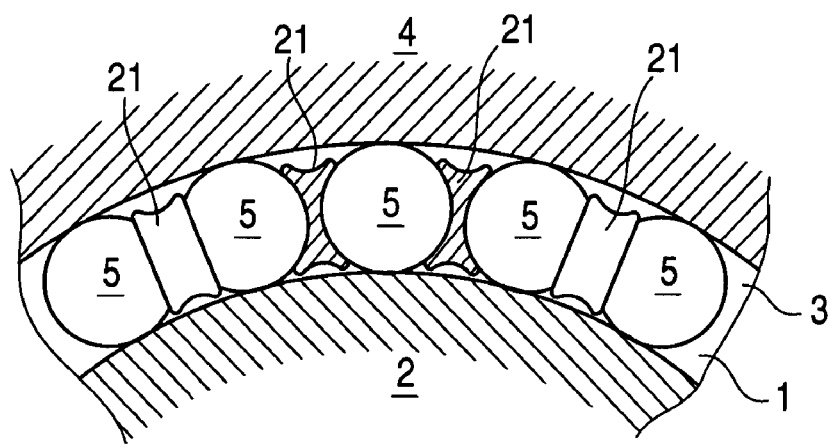
FIG. 6 is a partially enlarged view showing the tube-method ball screw device shown in FIG. 1, along its screw shaft.

FIGS. 1 to 4 shows the configurations of ball screw devices by way of example. Incidentally, according to the present invention, separators 21 are interposed among balls 5 as shown in FIG. 6 which is a partially enlarged sectional view along two thread grooves 1 and 3 in FIG. 1. The separators 21 move between the two thread grooves 1 and 3 or in the inside of tubes 8 along with rolling of the balls 5.

Figure 1:
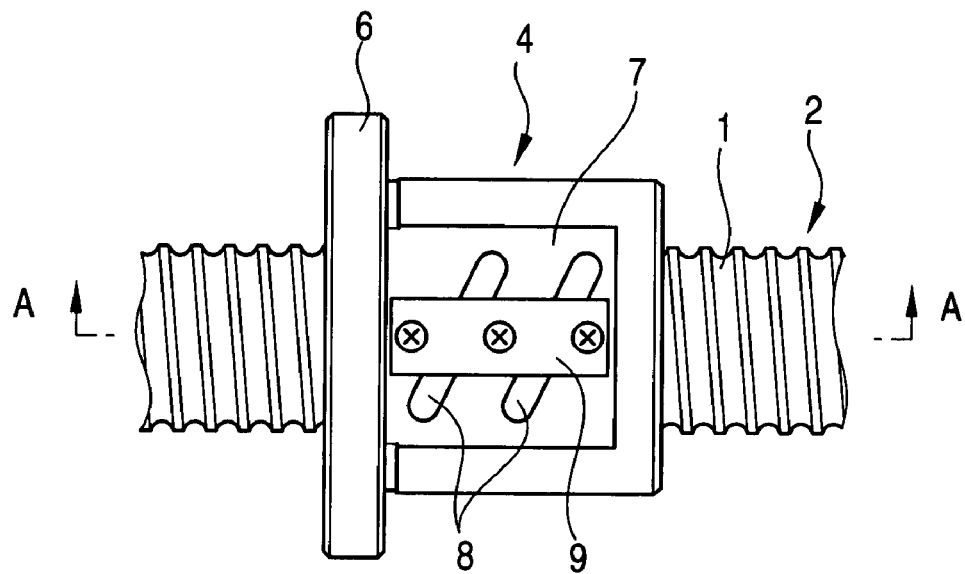
FIG. 1 is a top view showing an example of a tube-method ball screw device which is a kind of linear motion device according to the present invention.
Figure 2:
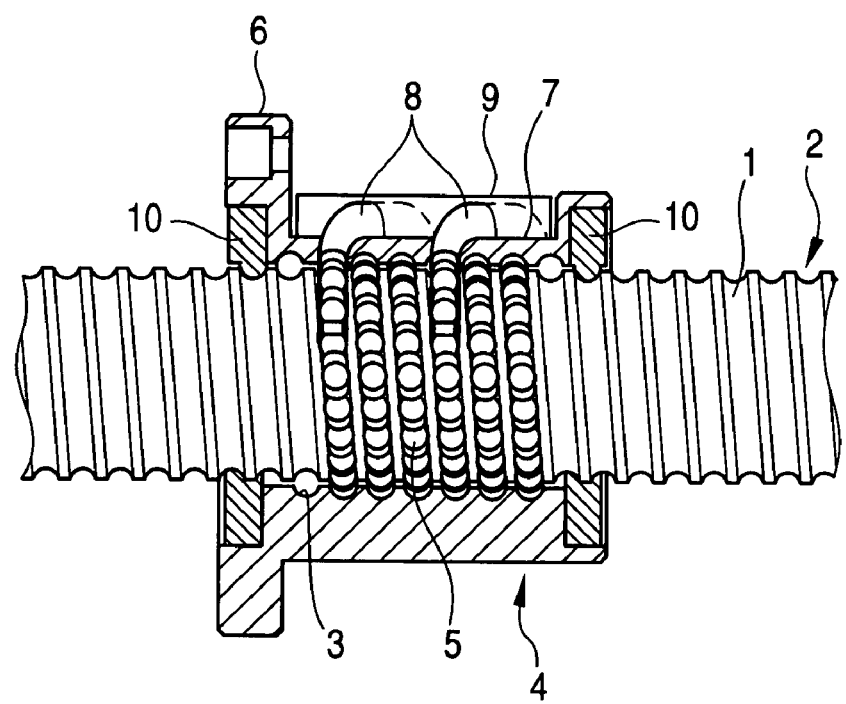
FIG. 2 is a sectional view taken on line A-A in FIG. 1.
Figure 3:
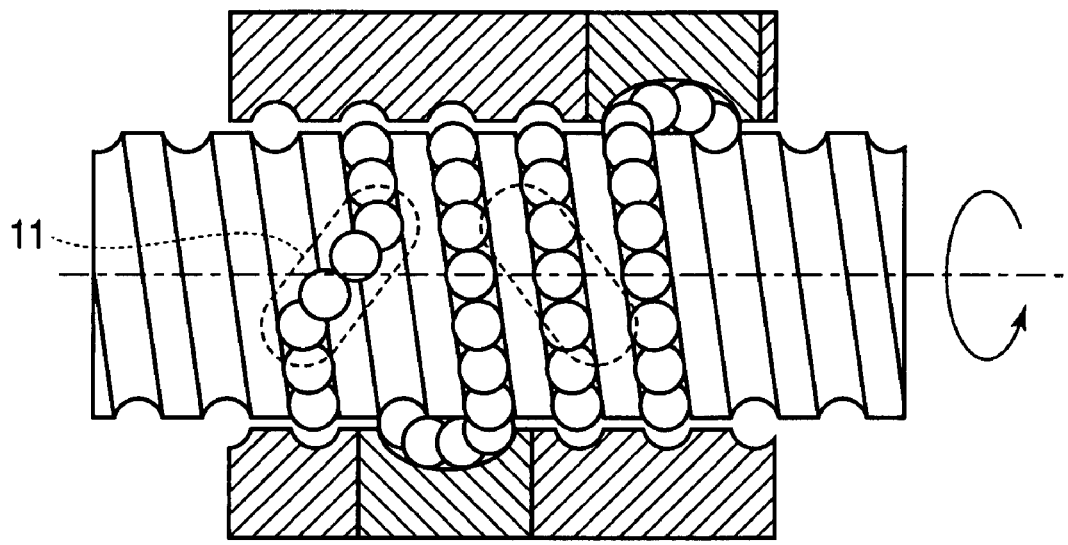
FIG. 3 is a top view showing an example of a deflector method ball screw device which is a kind of linear motion device according to the present invention.
Figure 4:
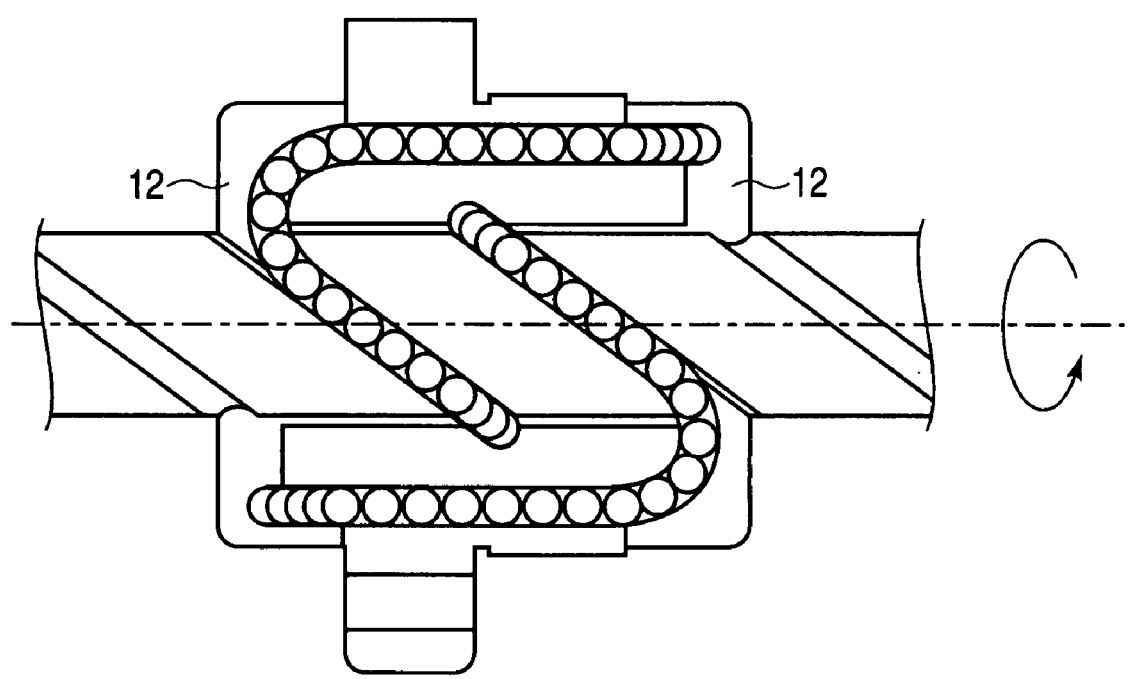
FIG. 4 is a top view showing an example of an end-cap-method ball screw device which is a kind of linear motion device according to the present invention.

In such a ball screw device, when a screw shaft 2 is driven to rotate by a not-shown motor or the like a nut 4 screwed down to the screw shaft 2 through the balls 5 screws in the front/rear direction (left/right direction in FIG. 1). On that occasion, the male thread groove 1 on the screw shaft 2 side and the female thread groove 3 on the nut 4 side rotate relatively in directions reverse to each other. Thus, the balls 5 roll relatively to the two thread grooves 1 and 3. During this rolling, the balls 5 will come in no contact with one another if the separators 21 are interposed among the balls 5. In addition, the relative sliding speed between the balls 5 and the separators 21 will be ½ as high as the relative sliding speed between balls in a ball screw device adopting a full ball system (that is, without any separator). Thus, the friction of the balls 5 can be suppressed in cooperation of lubricity deriving from the material of the separators 21. As a result, expected performance can be maintained in the ball screw device even if it is operated over a long term.

In the ball screw device according to the present invention, separators 21 each having a sectional shape shown in FIGS. 7 to 11, FIGS. 12A and 12B, FIGS. 13A to 13D and FIGS. 14A to 14D. Incidentally, examples of separator materials include resin having a lubricating effect in itself, such as polyamide (e.g. polyamide 66) or fluororesin, or polyethylene impregnated with lubricating oil. In addition, a material disclosed in Japanese Patent Application. No. 2001-389586 may be used.

Figure 7:
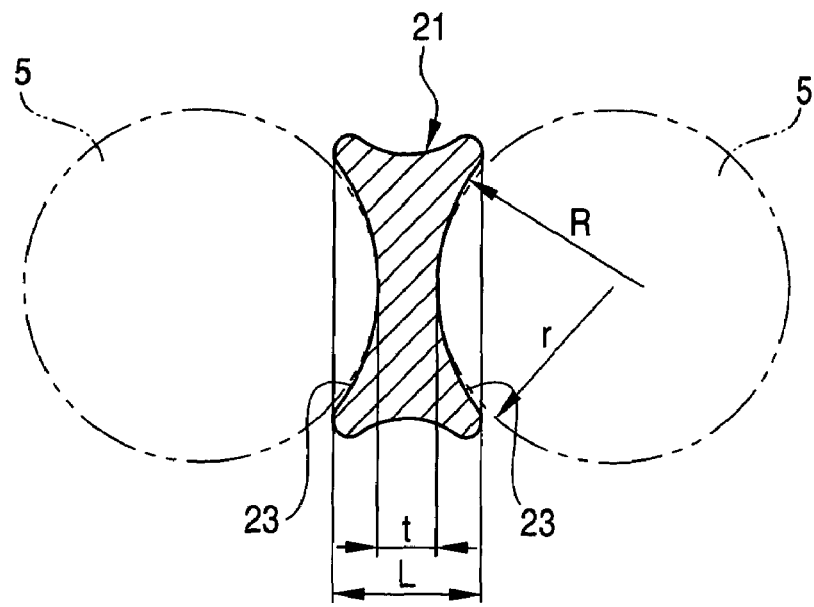
FIG. 7 is a sectional view showing a preferred embodiment of a separator.

The separator 21 shown in FIG. 7 comes in contact with the balls 5 on its opposite surfaces. Each of the surfaces is formed into a concave surface 23 having a curvature radius R larger than the radius r of each ball 5. The separator 21 configured thus comes in contact with the balls with a comparatively small area, and thickness t of the separator 21 in the central portion is smaller than thickness L of the separator 21 in the outer circumference. Thus, the interval between the balls 5 is reduced. In addition, the thickness t of the separator 21 in the central portion is small so that the total number of balls 5 is not so much reduced in comparison with that in a ball screw device adopting the full ball system. Thus, the reduction in load capacity and rigidity can be kept to a minimum. Further, since the concave surface 23 is formed with the curvature radius R larger than the radius r of each ball 5, the sliding resistance of the ball 5 against the concave surface 23 is reduced. While the sliding resistance is reduced, lubricant such as grease becomes easy to gain entrance through a gap formed between the outer circumferential edge of the concave surface 23 and the ball 5. Thus, the driving resistance of the screw shaft 2 is also reduced. In addition, an elastic preload is generally applied to the balls 5 when the ball screw device is assembled. On that occasion, the separators 21 are elastically deformed more easily than the balls 5 so that there is another advantage that the assembling work becomes easy.

Figure 8:
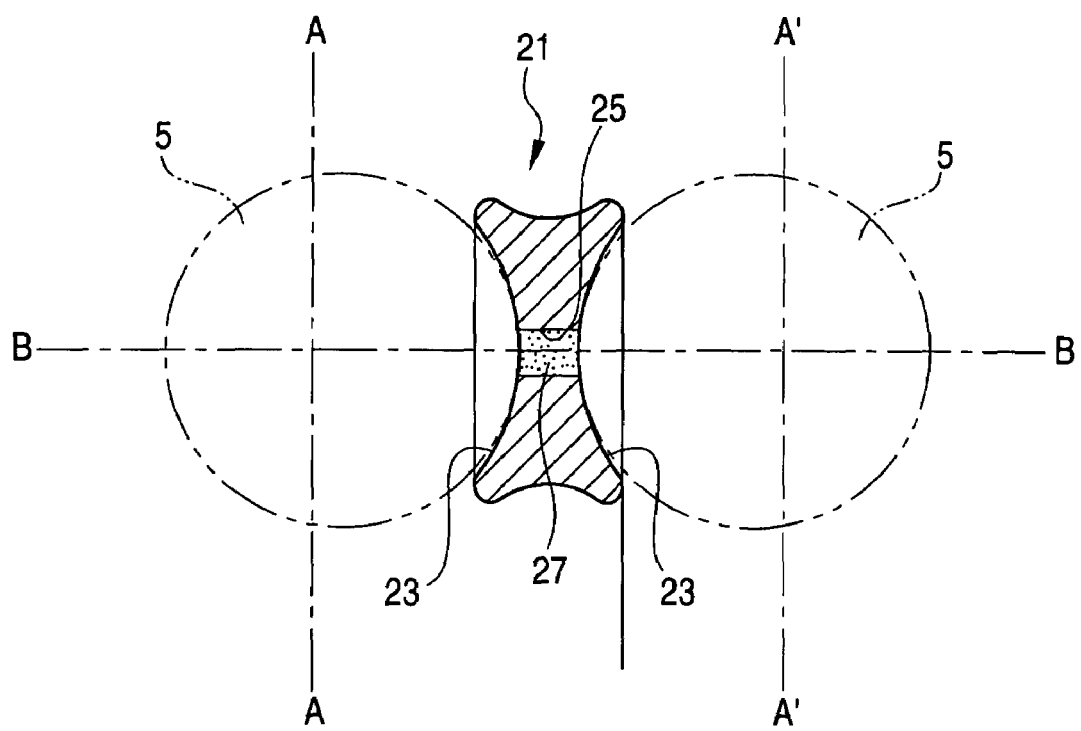
FIG. 8 is a sectional view showing another preferred embodiment of the separator.

The separator 21 shown in FIG. 8 is formed in such a manner that a through hole 25 communicating with the two concave surfaces 23 of the separator 21 shown in FIG. 7 is provided additionally in the separator 21 shown in FIG. 7, at a location of the central portion of the concave surfaces 23. According to this separator 21, lubricant 27 is retained in the through hole 25 so that the lubrication between the separator 21 and the balls 5 is performed more smoothly. Thus, the abrasion of the balls 5 or the driving resistance of the screw shaft 2 can be further reduced. This is because the balls 5 rotate on their axes A-A and A'-A' and in contact with the male thread groove 1 and the female thread groove 3 on the front and back paper surfaces parallel to the paper section B-B so that the lubricant 27 retained in the through hole 25 also gains entrance between the two thread grooves 1 and 3 by the effect of the rotations of the balls 5 on their axes. Thus, more effective lubrication can be obtained.

Figure 9:
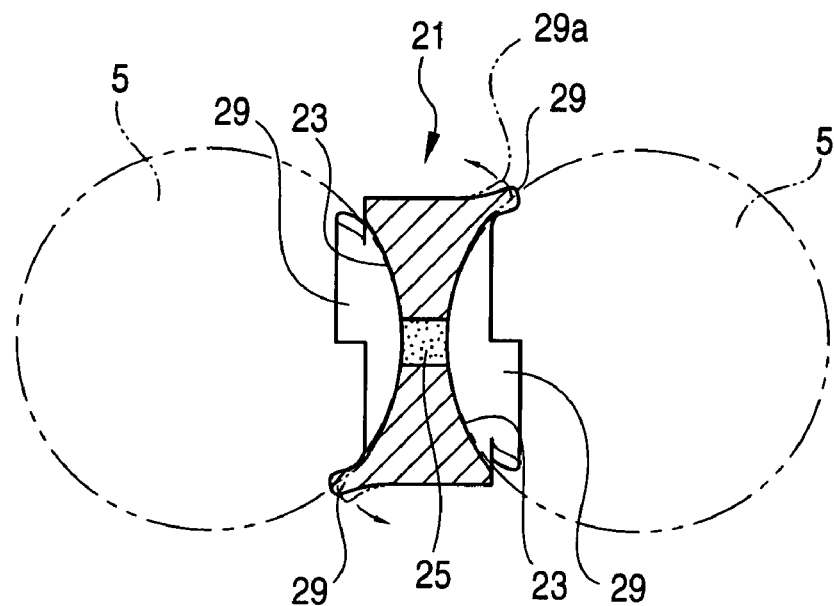
FIG. 9 is a sectional view showing a further preferred embodiment of the separator.
Figure 10:
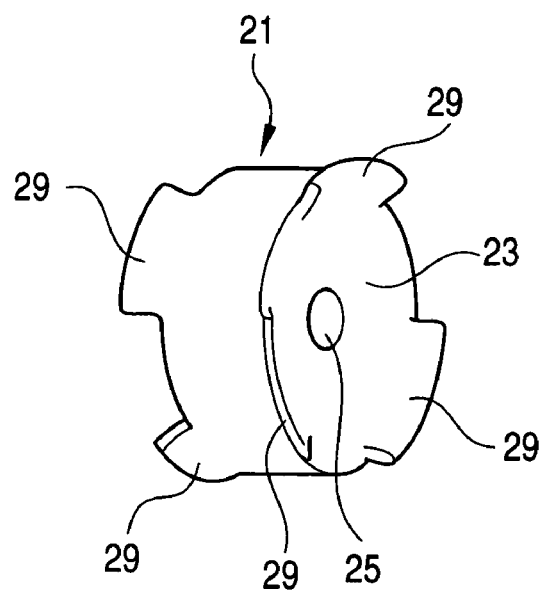
FIG. 10 is a sectional view showing the further preferred embodiment of the separator.

In the separator 21 shown in FIG. 9 (sectional view) and FIG. 10 (perspective view), a plurality of lips 29 (e.g. three lips 29 at an equal interval as illustrated) extending outward are provided additionally at the outer circumferential edge of each concave surface 23 of the separator 21 shown in FIG. 8. In this separator 21, the lips 29 are elastically deformed by the pressure applied from the balls 5 as illustrated by the broken lines (reference numeral 29a) in FIG. 9, respectively. Thus, it becomes easier to allow the lubricant to gain entrance between the separators 21 and the balls 5 while it becomes easier to apply an elastic preload to the balls 5 at the time of assembling. Further, there also occurs a centering action in the separators 21 with respect to the balls. In addition, since the lips 29 are formed at an equal interval (with the rotational phase difference of 60° in the illustrated embodiment), it is comparatively easy to produce a molding die.

Figure 11:
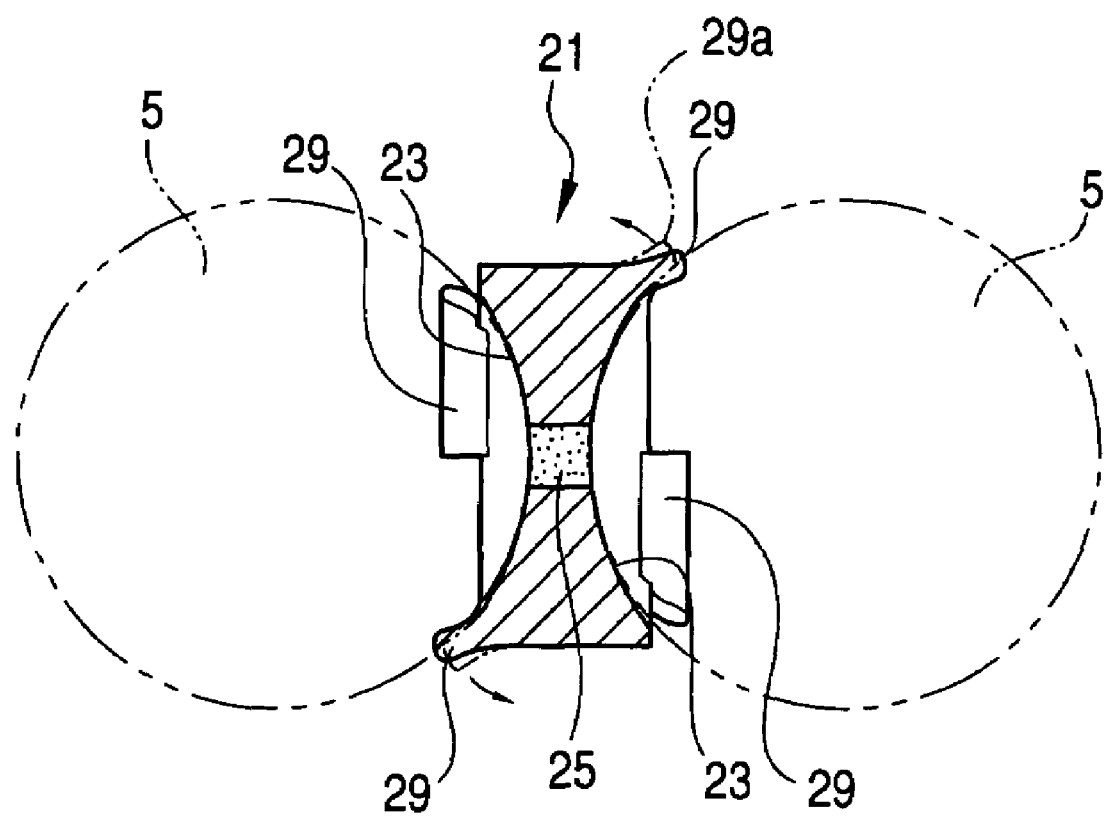
FIG. 11 is a sectional view showing a still further preferred embodiment of the separator.

Alternatively, the lips 29 may be formed as separate members in the separator 21 shown in FIGS. 9 and 10. FIG. 11 shows a sectional view of the separator 21 configured thus. For example, the body of the separator 21 having the concave surfaces 23 is made of comparatively hard resin, and the lips 29 are made of comparatively soft resin or rubber. These separator body and lips are integrated by an insert injection molding method. Thus, the separator 21 can be formed. In the separator 21 having the lips 29 as separate members, the elastic modulus of the lips 29 can be set desirably. It is therefore easier to apply the elastic preload to the balls 5, while the centering action occurs more effectively.

Figure 12A:
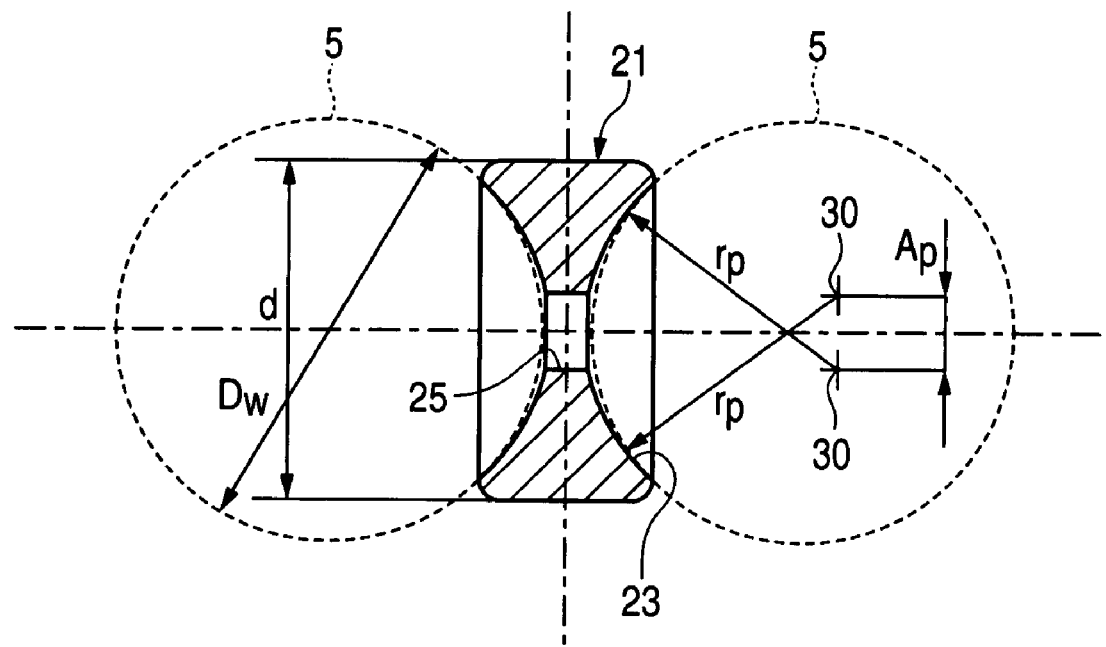
FIGS. 12A and 12B are sectional views showing another preferred embodiment of the separator.
Figure 12B:
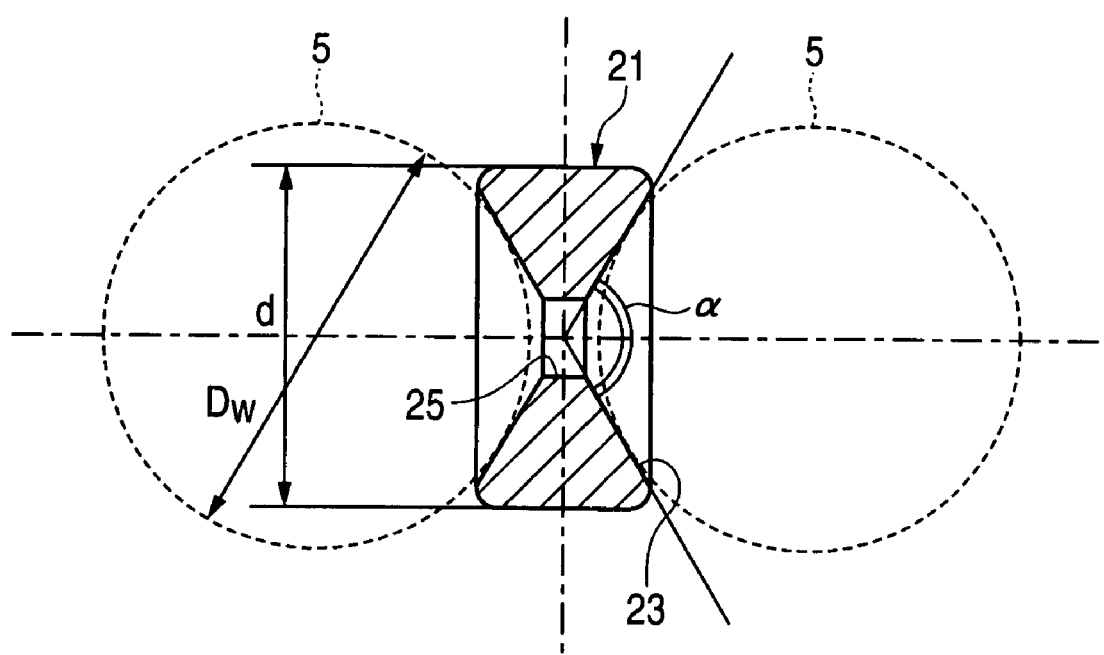
Figure 13A:
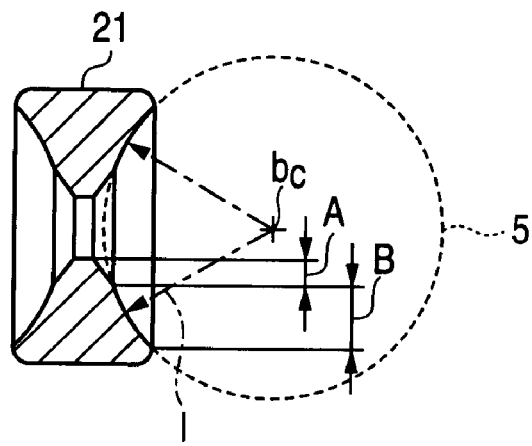
FIGS. 13A to 13D are sectional views showing a further preferred embodiment of the separator.
Figure 13B:
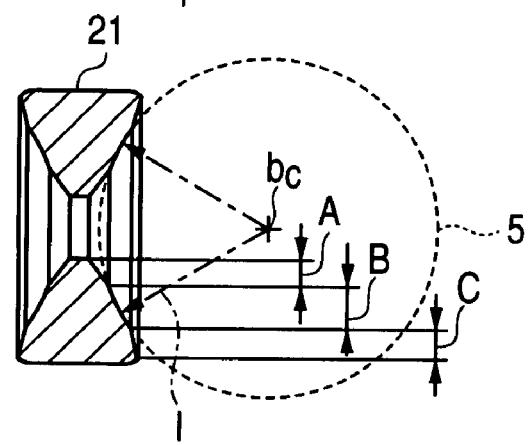
Figure 13C:
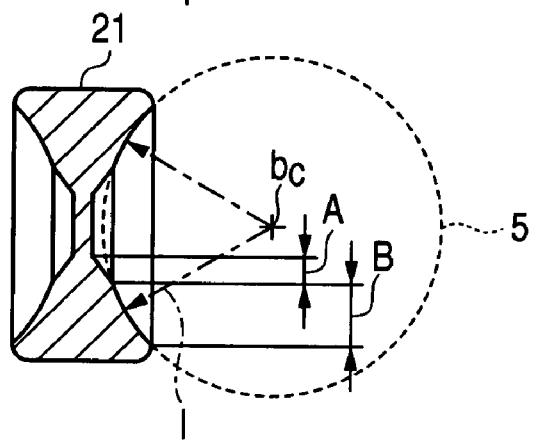
Figure 13D:
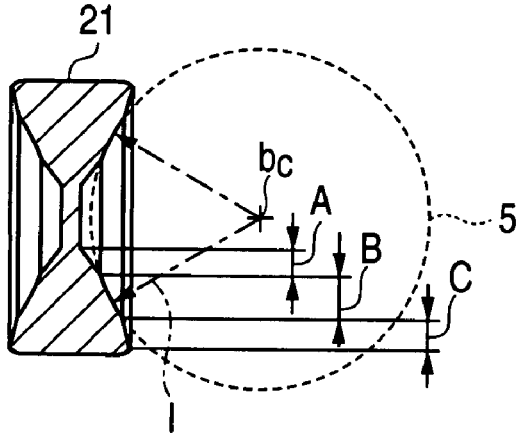
Figure 14A:
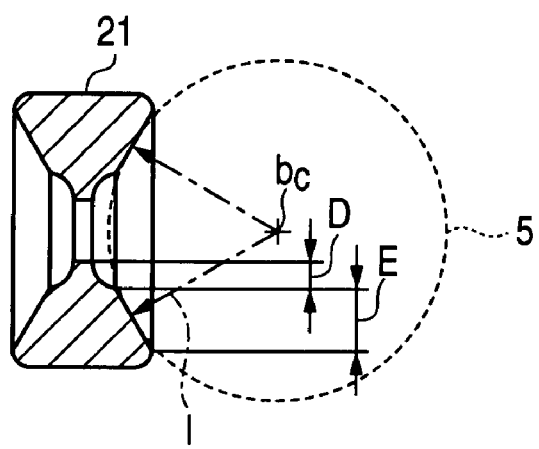
FIGS. 14A to 14D are sectional views showing a still further preferred embodiment of the separator.
Figure 14B:
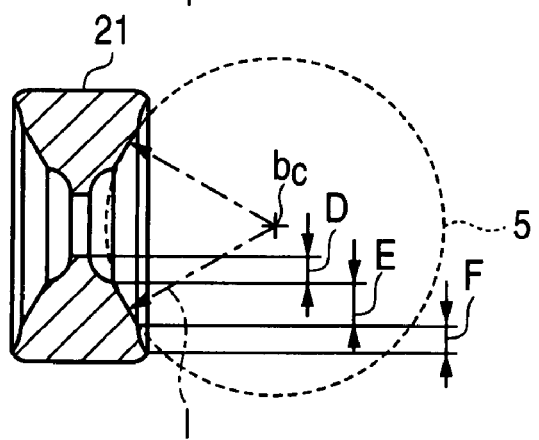
Figure 14C:
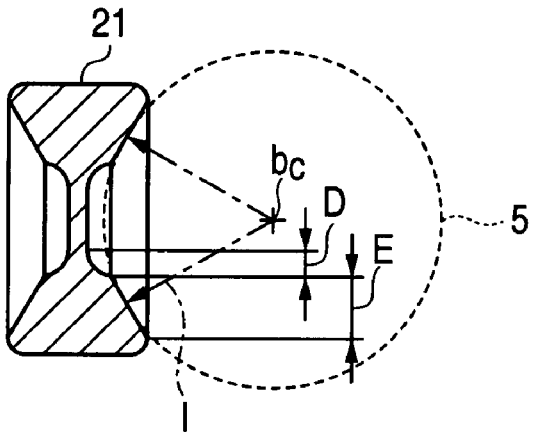
Figure 14D:
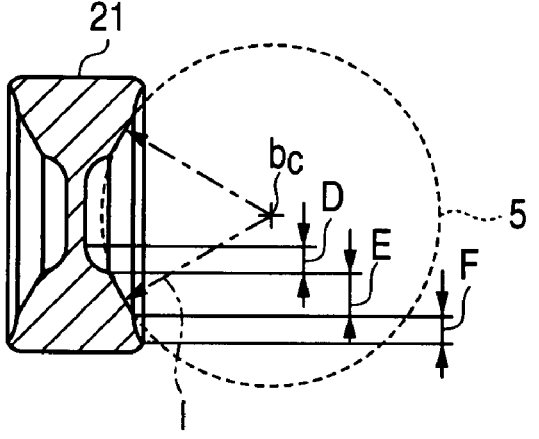

Further, as shown in FIGS. 12A and 12B, the separator 21 may be formed as either a separator (FIG. 12A) which has an offset Gothic arch shape, and in which a ratio $f_p=r_p/D_w$ of a curvature radius $r_p$ of the concave surface 23 to a ball diameter $D_w$ is in a range of from 0.53 to 0.67, a ratio $\Gamma=A_p/D_w$ of an offset $A_p$ of the Gothic arch shape to the ball diameter $D_w$ is in a range of from $3.486 \times 10^{-1} f_p - 1.743 \times 10^{-1}$ to $3.390 f_p - 1.700$, and a ratio $\theta = d/D_w$ of an outer diameter d of the separator to the ball diameter $D_w$ is in a range of from 0.65 to 0.85, or a separator (FIG. 12B) in which each of contact portions of the concave surfaces with the balls has a conical surface shape with an apex angle $\alpha$ not smaller than 64° and not larger than 140°, and a ratio $\theta=d/D_w$ of an outer diameter d of the separator to the ball diameter $D_w$ is in a range of from 0.65 to 0.85.

Figure 15:
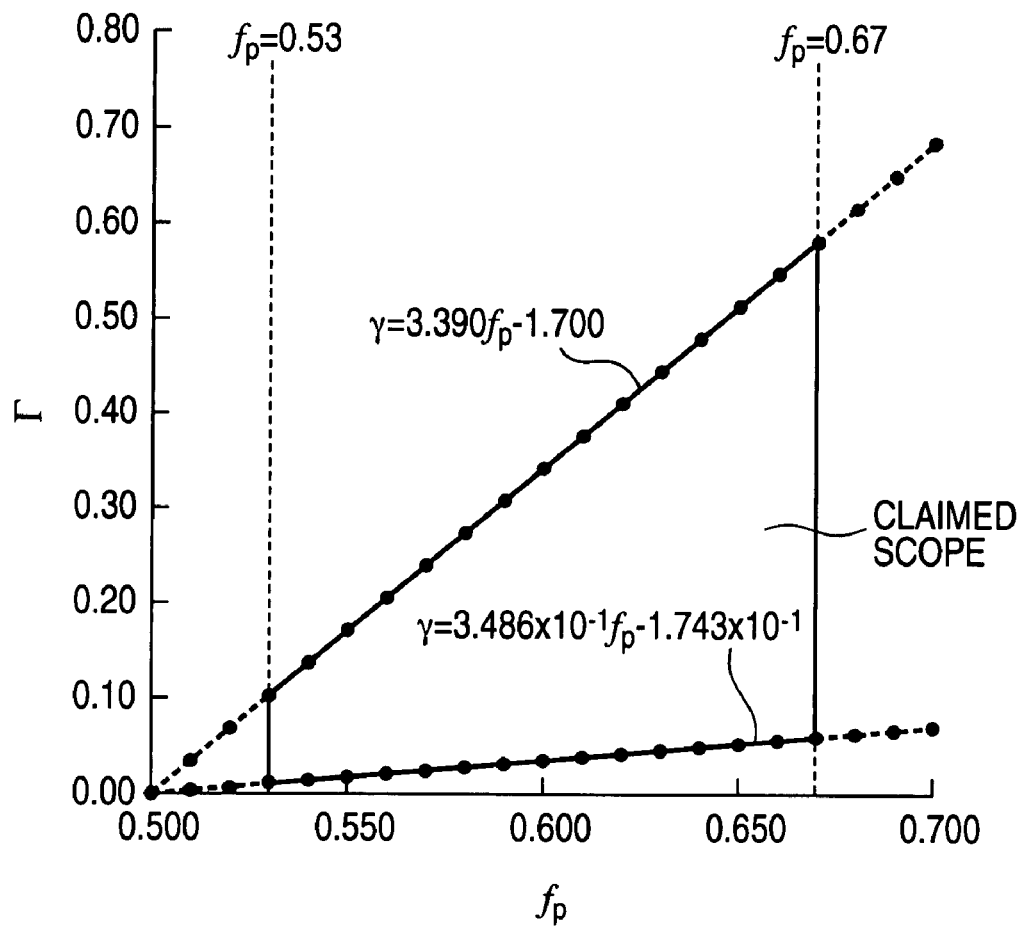
FIG. 15 is a graph showing the conditions the values $f_p$ and $\Gamma$ of the separator should satisfy.

Description will be made specifically. In the separator 21 shown in FIG. 12A, the contact portion of each concave surface 23 with the ball 5 has a Gothic arch shape, having an offset curvature center 30 in its radial direction and a through hole 25 formed in its central portion. In addition, when d (mm) designates the outer diameter of the separator 21, $D_w$ (mm) designates the ball diameter, $r_p$ (mm) designates the curvature radius of the concave surface 23, and $A_p$ (mm) designates the offset of the Gothic arch shape, the concave surface 23 is designed to satisfy the following relationship. That is, the ratio $f_p=r_p/D_w$ of the curvature radius $r_p$ to the ball diameter $D_w$ is in a range of from 0.53 to 0.67, the ratio $\Gamma=A_p/D_w$ of the offset $A_p$ to the ball diameter $D_w$ is in a range of from $3.486 \times 10^{-1} f_p - 1.743 \times 10^{-1}$ to $3.390 f_p - 1.700$, and the ratio $\theta=d/D_w$ of the outer diameter d to the ball diameter $D_w$ is in a range of from 0.65 to 0.85. Incidentally, the conditions that the values $\Gamma$ and $f_p$ should satisfy are shown in FIG. 15.

On the other hand, in the separator 21 shown in FIG. 12B, the contact portion of each concave surface 23 with the ball 5 has a conical shape, and further a through hole 25 is formed in the central portion. In addition, when d (mm) designates the outer diameter of the separator 21, $D_w$ (mm) designates the ball diameter, and $\alpha$ (°) designates the apex angle of the conical surface, the concave surface 23 is designed to satisfy the following relationship. That is, the apex angle $\alpha$ is not smaller than 64° and not larger than 140°, and the ratio $\theta=d/D_w$ is in a range of from 0.65 to 0.85.

When each of the separators 21 shown in FIGS. 12A and 12B has the concave surface 23 defined as described above, the contact portion between the ball 5 and the separator 21 is formed into a ring-like shape so that the effect of holding the separator 21 in the center between the balls 5 is enhanced. Thus, the balls 5 can be kept at an equal interval effectively so that an offset load caused by the displacement of the nut 4 relative to the screw shaft 2 is hardly applied to the balls 5. Accordingly, the durability of the linear motion device is improved. In addition, since the central portion of the separator 21 is sunk, effect similar to that in each separator 21 described previously can be obtained. Accordingly, the ball screw device mounted with the separators 21 shown in FIG. 12A or 12B is suitable for use in high contact pressure conditions.

Incidentally, of the concave surface 23, only the contact portion with the ball 5 may be formed into the Gothic arch or conical surface shape. The concave surface 23 may be formed into any shape if it allows each ball 5 and each separator 21 to come in ring-like contact with each other so that the balls 5 can be kept at an equal interval. Modification or improvement may be made desirably within a scope not to hinder the effect of keeping the balls 5 at an equal interval. For example, as shown in FIGS. 13A to 13D and FIGS. 14A to 14D, the shape of the concave surface 23 other than its contact portion with the ball 5 may be not formed into a Gothic arch or conical surface shape but formed into a complex concave surface shape. Incidentally, in FIGS. 13A to 13D and FIGS. 14A to 14D, the reference sign $b_c$ designates the ball center, and the reference sign I designates the contact direction and position between the ball 5 and the separator 21. In addition, in FIGS. 13A to 13D, the reference sign A designates the conical surface inside the contact portion; B, the Gothic arch shape portion of the contact portion defined in the above description; and C, the conical surface outside the contact portion. In FIGS. 14A to 14D, the reference sign D designates the spherical surface inside the contact portion; E, the conical surface of the contact portion defined in the above description; and F, the spherical surface outside the contact portion. Each portion other than the portions designated by the signs B and E may be formed into any shape. In addition, each separator 21 may have no through hole 25 in its central portion.

The ball screw device according to the present invention is mounted with the separators 21 having a specific shape described above. In addition, it is preferable that the ratio $f=r/D_w$ of the radius r of the rolling element groove to the ball diameter $D_w$ is set to be 0.505-0.550. Particularly, the ratio f is preferably set to be 0.510-0.530. When the ratio f exceeds 0.550, the maximum contact pressure between each ball 5 and the rolling element groove becomes excessively high so that the durability of the ball screw device deteriorates. On the contrary, when the ratio f is lower than 0.505, the contact ellipse is apt to run onto the shoulder portion of the rolling element groove. Thus, there is a fear that the durability of the ball screw device deteriorates. When the ratio f is in the range of 0.505-0.550, the contact ellipse hardly runs onto the shoulder portion of the rolling element groove, and the maximum contact pressure between each ball 5 and the rolling element groove can be suppressed to below. Thus, the durability of the ball screw device is improved.

Grease is charged into the ball screw device configured thus. The grease will be described below in detail.

Base oil of the grease is not limited in kind if the kinematic viscosity of the base oil is in a range of 50-500 $mm^2/s$. Mineral-based lubricating oil and synthetic lubricating oil can be used preferably. Though not limited, paraffin-based mineral oil, naphthene-based mineral oil, and mixed oil of these oils may be used as examples of the mineral-based lubricating oil. Though not limited, synthetic hydrocarbon oil, ether oil, ester oil and fluorine oil may be used as examples of the synthetic lubricating oil. A specific example of synthetic hydrocarbon oil is poly α-olefin oil. Specific examples of ether oil may include dialkyl diphenyl ether oil, alkyl triphenyl ether oil, and alkyl tetraphenyl ether oil. Specific examples of ester oil may include diester oil, neopentyl type polyol ester oil, complex ester oil of those ester oils, and aromatic ester oil. Specific examples of fluorine oil may include perfluoro ether oil, fluorosilicone oil, chlorotrifluoroethylene oil, and fluorophosphazene oil. Each of these lubricating oils may be used singly or in desired combination with another or other kinds of the lubricating oils. Of the lubricating oils, it is preferable that the synthetic lubricating oil is contained when the lubricating performance and the life of the lubricating oil at a high temperature and at a high speed is taken into consideration. Particularly, it is preferable that ester oil or ether oil is used singly as base oil. In addition, from the point of view of the cost, it is preferable that the mineral-based lubricating oil is contained.

When the kinematic viscosity of the base oil at 40° C. is lower than 50 $mm^2/s$, the oil film thereof becomes so thin that direct contact of metal with metal is apt to occur. Thus, the durability deteriorates. On the contrary, when the kinematic viscosity is higher than 500 $mm^2/s$, the working torque increases so that the advantage of small friction loss is spoiled. Further, the calorific power increases so that there is a fear that the durability deteriorates. Particularly, it is preferable that the kinematic viscosity of the base oil at 40° C. is in a range of 100-500 $mm^2/s$.

Any thickener for the grease can be used without any particular limitation if the thickener is a substance dispersable colloidally in the base oil to thereby make the base oil semisolid or solid. Examples of such thickener may include metal-soap-based thickener such as lithium soap, calcium soap, sodium soap, aluminum soap, lithium complex soap, calcium complex soap, sodium complex soap, barium complex soap or aluminum complex soap; inorganic-based thickener such as bentonite or clay; and organic-based thickener such as monourea compound, diurea compound, triurea compound, tetraurea compound, urethane compound, sodium terephthalate, or calcium sulfonate complex. Of the thickeners, the urea compounds are preferred. In addition, each of these thickeners may be used singly or in desired combination of another or other kinds of the thickeners.

It is preferable that the content of the thickener is 3-40% by mass, particularly 5-25% by mass, with respect to the total mass of the grease. Incidentally, when a plurality of kinds of thickeners are used, the total mass of the thickeners is regarded as the aforementioned content. When the content of the thickeners is lower than 3% by mass, it becomes difficult to keep the state of the grease. Thus, there is a fear that the grease flows out. On the contrary, when the content of the thickener is higher than 40% by mass, the grease is too hard to expect a satisfactory lubricating effect, and the torque is increased inevitably.

In addition, various additives may be added to the grease by request in order to improve various properties. For example, each of an extreme pressure agent, an antioxidant, an antirust, an oiliness improver, and a metal deactivator may be added singly or in combination with another or other kinds of the additives within a scope not to spoil the effect of the present invention. Known additives may be used. Preferred examples of the additives will be listed below.

Examples of the antioxidant may include an amine-based antioxidant such as phenyl-1-naphthylamine; a phenyl-based antioxidant such as 2,6-di-t-butylphenol; a sulfur-based antioxidant; and a zinc-dithiophosphate-based antioxidant.

Examples of the antirust may include organic sulfonate of alkali metal or alkaline-earth metal; alkyl or alkenyl succinic acid derivative such as alkyl or alkenyl succinic ester; and partial ester of polyhydric alcohol such as sorbitan monooleate.

Examples of the oiliness improver may include fatty acid and animal/vegetable oil.

An example of the metal deactivator is benzotriazole.

The extreme pressure agent is particularly a preferred additive when use in high load conditions is taken into consideration. The extreme pressure agent shows the highest effect in combination with the separators 21 shown in FIGS. 12A and 12B, FIGS. 13A to 13D or FIGS. 14A to 14D. Of the extreme pressure agents, metal salts of organic acid using metal species such as nickel, molybdenum and tellurium; coordination compound likewise; addition compound likewise; alkyl metal compound likewise; metal ester compound likewise; and metal alkoxide compound likewise are preferably used. In addition, as the metal salts of organic acid, organic carboxylic acid based metal salt, organic sulfur-based metal salt, and organic phosphorus-based metal salt are preferable. Particularly, metal dithiocarbamate expressed by the following general formula (I) and metal dithiophosphate expressed by the following general formula (II) are preferable.

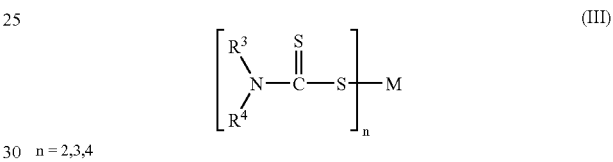

n=2, 3, 4
x, y, z=0, 1, 2, 3, 4

In the general formulae (I) and (II), M designates nickel, molybdenum or tellurium. In addition, $R^1$ and $R^2$ may be the same or different, each designating alkyl group, cycloalkyl group, alkenyl group, aryl group, alkyl aryl group, or aryl alkyl group. Examples of particularly preferable group may include 1,1,3,3-tetramethylbutyl group, 1,1,3,3-tetramethylhexyl group, 1,1,3-trimethylhexyl group, 1,3-dimethylbutyl group, 1-methylundecane group, 1-methylhexyl group, 1-methylpentyl, 2-ethylbutyl group, 2-ethylhexyl group, 2-methylcyclohexyl group, 3-heptyl group, 4-methylcyclohexyl group, n-butyl group, isobutyl group, isopropyl group, isoheptyl group, isopentyl group, undecyl group, eicosyl group, ethyl group, octadecyl group, octyl group, cyclooctyl group, cyclododecyl group, cyclopentyl group, dimethylcyclohexyl group, decyl group, tetradecyl group, docosyl group, dodecyl group, tridecyl group, trimethylcyclohexyl group, nonyl group, propyl group, hexadecyl group, hexyl group, henicosyl group, heptadecyl group, heptyl group, pentadecyl group, pentyl group, methyl group, tertiary butylcyclohexyl group, tertiary butyl group, 2-hexenyl group, 2-methallyl group, allyl group, undecenyl group, oleyl group, decenyl group, vinyl group, butenyl group, hexenyl group, heptadecenyl group, tolyl group, ethylphenyl group, isopropylphenyl group, tertiary butylphenyl group, dibasic pentylphenyl group, n-hexylphenyl group, tertiary octylphenyl group, isononylphenyl group, n-dodecylphenyl group, phenyl group, benzyl group, 1-phenylmethyl group, 2-phenylethyl group, 3-phenylethyl group, 1,1-dimethylbenzyl group, 2-phenylisopropyl group, 2-phenylhexyl group, benzhydryl group, and biphenyl group. In addition, each of these groups may have ether condensation.

As for metal salt of organic acid other than compounds expressed by the general formulae (I) and (II), metal salt between 2-mercaptobenzothiazole and nickel, molybdenum or tellurium is preferable. Further, metal salt between nickel, molybdenum or tellurium and naphthenic acid or fatty acid is also preferable.

Further, compounds expressed by the following general formula (III) can be used as the organic nickel compound, the organic molybdenum compound and the organic tellurium compound.

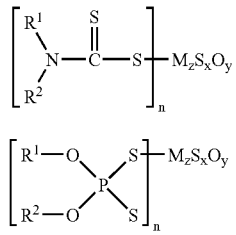

n = 2,3,4

In the general formula (III), M designates nickel, molybdenum or tellurium. In addition, $R^3$ and $R^4$ may be the same or different, each designating alkyl group or aryl group.

Each of the organic nickel compound, the organic molybdenum compound and the organic tellurium compound is added singly or in desired combination with the other. The loading of the additive on this occasion is in the range of 0.1-15% by mass with respect to the total mass of the grease. Particularly, the range of 0.5-5% by mass is preferable. When the loading is lower than 0.1% by mass, the additive is too dilute to obtain the effect of improving the durability. On the contrary, when the loading is higher than 15% by mass, not only is it impossible to obtain the effect of improving the durability correspondingly to the increase of the loading, but there is also a fear that the durability deteriorates due to progress of abrasion caused by a chemical action.

Other additives that can be used may include organic zinc compounds such as zinc dialkyl dithiophosphate, zinc diaryldithionate and zinc dialkyl dithiocarbamate; phosphates; and phosphites.

Any additive other than the aforementioned additives may be added as long as it does not spoil the performance required of the grease according to the present invention.

The grease configured thus is in a range of 220-395, preferably in a range of 265-350 in worked penetration defined by JIS K2220. When the worked penetration is lower: than 220, the grease is too hard to expect a satisfactory lubricating effect. On the contrary, when the worked penetration is higher than 395, the grease is excessively soft so that there is a fear that the grease flows out.

The embodiments of the present invention have described above on the case where a ball screw device is used by way of example. Similarly, the grease and the spacers can be applied to linear guide devices or linear ball bearing devices which are other linear motion devices. Thus, the respective linear motion devices can be improved in durability.

Figure 5:
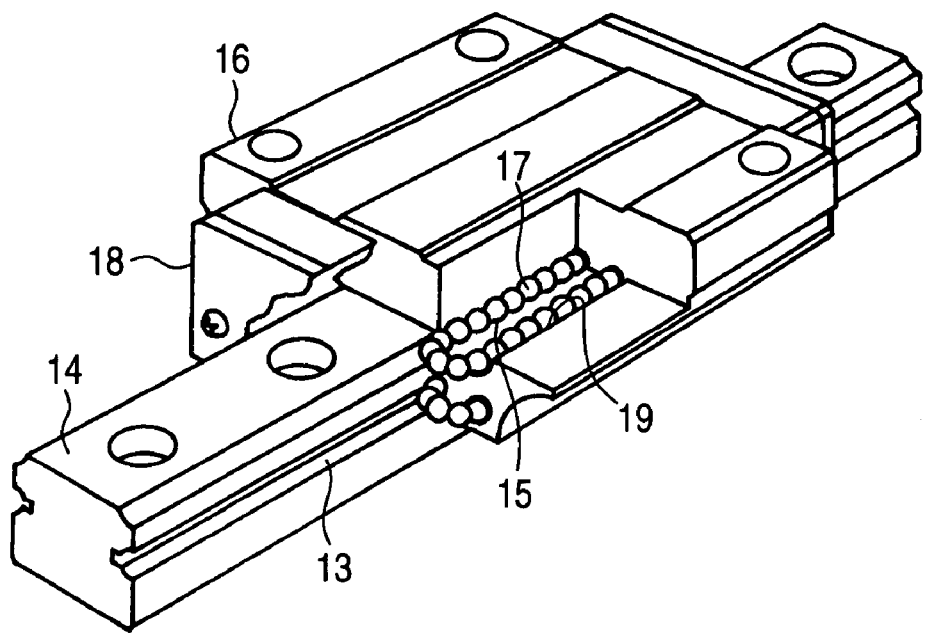
FIG. 5 is a partially cutaway perspective view showing an example of a linear guide device which is a kind of linear motion device according to the present invention.

For example, a linear guide device having the configuration shown in FIG. 5 may be adopted. Preferably the separators 21 shown in FIGS. 7 to 11, FIGS. 12A and 12B, FIGS. 13A to 13D and FIGS. 14A to 14D are mounted, and further the grease is charged in the linear guide device.

Figure 16:
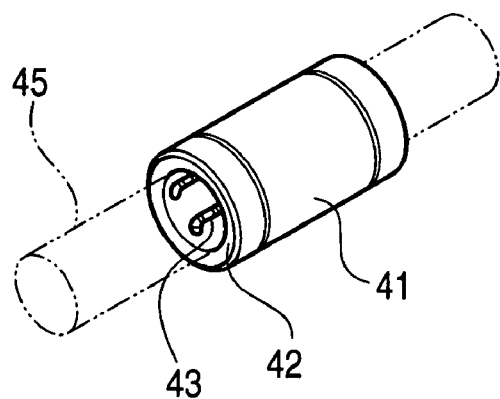
FIG. 16 is a perspective view showing an example of a linear ball bearing device which is a kind of linear motion device according to the present invention.

In addition, a linear ball bearing device having the configuration shown in FIG. 16 may be adopted. The illustrated linear ball bearing device has an outer cylinder 41 and a retainer 42. The retainer 42 is received inside the outer cylinder 41. A substantially track-like guide groove is formed in the outer circumferential surface of the retainer 42 so as to extend along the axis of the retainer 42. Balls and separators 21 preferably shown in FIGS. 7 to 11, FIGS. 12A and 12B, FIGS. 13A to 13D and FIGS. 14A to 14D are received rollably in the guide groove, and further the aforementioned grease is charged therein. In addition, a notch window 43 is opened in the retainer 42 so as to extend along the axis of the retainer 42, and a part of the balls received in the guide groove protrude from the notch window 43. Then, the linear ball bearing device is fitted onto a linear shaft 45 so as to move the linear shaft 45 linearly.

The present invention will be described further with its examples and comparative examples.

EXAMPLES 1 TO 4 AND COMPARATIVE EXAMPLES 1 to 3

Greases A to F were prepared by compositions shown in Table 1. Incidentally, nickel dithiocarbamate, molybdenum dithiocarbamate and tellurium dithiocarbamate expressed by the general formula (I) were used as extreme pressure agents in the greases A to F. In addition, in each of the greases, amine-based antioxidant (PAN) was used as antioxidant, and barium sulfonate was used as antirust. In addition, the kinematic viscosity of used base oil at 40° C. and the worked penetration (JIS K2220) of each grease obtained were put down together in Table 1.

Then, by use of ball screw devices (bearing number: BS8020-7.5, shaft diameter: 80 (mm)) made by NSK Ltd., test ball screw devices were manufactured with different kinds of separators and different kinds of greases as shown in Table 2. The test ball screw devices were operated continuously without feeding oil thereto on the way, and the number of reciprocating cycles before the occurrence of peeling and the number of reciprocating cycles before seizure were measured.

TABLE 1

| | Grease Recipe | | | | | |
|---|---|---|---|---|---|---|
| | Grease A | Grease B | Grease C | Grease D | Grease E | Grease F |
| thickener | Urea | urea | lithium | urea | urea | lithium |
| thickener loading | 8.50 | 9.80 | 7.40 | 6.00 | 13.60 | 4.10 |
| base oil | mineral oil | mineral oil | mineral oil | PAO | mineral oil | mineral oil |
| base oil kinematic viscosity coefficient | 460 | 150 | 460 | 410 | 32 | 460 |
| extreme pressure agent loading | 1.00 | 1.00 | 1.00 | 1.00 | 1.00 | 1.00 |
| antioxidant loading | 1.00 | 1.00 | 1.00 | 1.00 | 1.00 | 1.00 |
| antirust loading | 1.00 | 1.00 | 1.00 | 1.00 | 1.00 | 1.00 |
| worked penetration | 310 | 265 | 333 | 350 | 290 | 415 | note 1)
loading: % by mass
note 2)
base oil kinematic viscosity coefficient: mm$^2$/s, 40° C.
note 3)
worked penetration: JIS K2220

TABLE 2

| Comparison of Durability between Examples and Comparative Examples | | | | |
|---|---|---|---|---|
| | used separator | charged grease | cycle number before occurrence of peeling | cycle number before occurrence of seizure |
| Example 1 | concave sphere (FIG. 7) | A | 810,000 | 880,000 |
| Example 2 | concave sphere with through hole (FIG. 8) | B | 950,000 | 1,000,000 |
| Example 3 | lip integral-type (FIGS. 9 and 10) | C | 1,080,000 | 1,120,000 |
| Example 4 | lip separate-type (FIG. 11) | D | 1,160,000 | 1,190,000 |
| Comparative Example 1 | none | A | 520,000 | 610,000 |
| Comparative Example 2 | concave sphere (FIG. 7) | E | 720,000 | 770,000 |
| Comparative Example 3 | lip integral-type (FIGS. 9 and 10) | F | — | 570,000 | note 1)
cycle number: times
note 2)
the cycle number before occurrence of peeling in Comparative Example 3 was not measured due to outflow of the grease The result is shown in Table 2. It is understood that the durability is improved greatly by charging greases A to D according to the present invention.

According to the present invention, occurrence of indentation or peeling in the ball surface and the raceway surface is suppressed and the durability of a linear motion device is improved.

What is claimed is:
1. A linear motion device comprising:
a linear motion body externally fitted onto a shaft and making a relative linear motion along the shaft;

a plurality of balls retained in a rolling element groove formed in an inner surface of the linear motion body, and rolling between the rolling element groove and the shaft;

a circulating path formed in the linear motion body and for circulating the balls from one end side of the rolling element groove to the other end side thereof; and separators interposed among the balls;

wherein each of the separators has contact surfaces each contacting with the ball and having a concave surface like an offset Gothic arch, a ratio $f_p = r_p/D_w$ of a curvature radius $r_p$ of the concave surface to a ball diameter $D_w$ is in a range of from 0.53 to 0.67, a ratio $\Gamma = A_p/D_w$ of an offset $A_p$ of the Gothic arch to the ball diameter $D_w$ is in a range of from $3.486 \times 10^{-1} f_p - 1.743 \times 10^{-1}$ to $3.390 f_p - 1.700$, and a ratio $\theta = d/D_w$ of an outer diameter d of the separator to the ball diameter $D_w$ is in a range of from 0.65 to 0.85, or each of the separator has concave surfaces each contacting with the ball, the concave surface being a conical surface shape with an apex angle $\alpha$ of 64° to 140°, and a ratio $\theta = d/D_w$ of an outer diameter d of the separator to the ball diameter $D_w$ is in a range of from 0.65 to 0.85;

wherein the linear motion device is charged with grease containing base oil and thickener, the base oil being 50-500 mm$^2$/s in kinematic viscosity at 40° C., the thickener being contained at 3-40% by mass with respect to whole mass of the grease so that worked penetration defined by JIS K2220 is 220-395.

2. The linear motion device according to claim 1, wherein the grease contains at least one kind of extreme pressure agent selected from an organic nickel compound, an organic molybdenum compound and an organic tellurium compound at 0.1-15% by mass with respect to whole mass of the grease.

3. The linear motion device according to claim 2, wherein a ratio $f = r/D_w$ of a rolling element groove radius r to the ball diameter $D_w$ is in a range of from 0.505 to 0.550.

4. The linear motion device according to claim 3, wherein the linear motion device is a ball screw device.

5. The linear motion device according to claim 2, wherein the linear motion device is a ball screw device.

6. The linear motion device according to claim 1, wherein a ratio $f = r/D_w$ of a rolling element groove radius r to the ball diameter $D_w$ is in a range of from 0.505 to 0.550.

7. The linear motion device according to claim 6, wherein the linear motion device is a ball screw device.

8. The linear motion device according to claim 1, wherein the linear motion device is a ball screw device.

* * * * *